Figure 1:
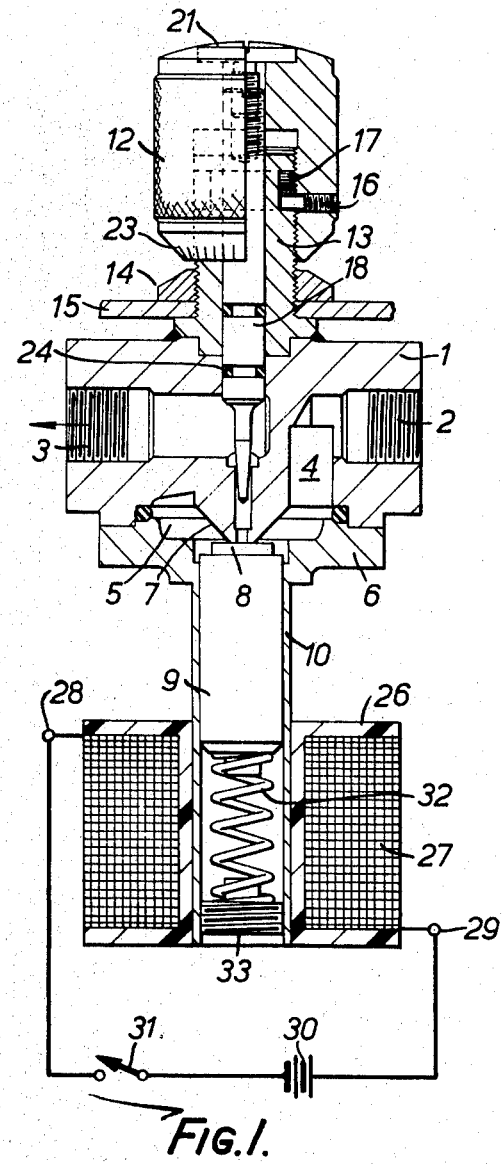

United States Patent

[11] 3,538,951

| [72] | Inventor | Norris Bownass, Stevenage, England |
|------|----------|-----------------------------------|
| [21] | Appl. No. | 716,753 |
| [22] | Filed | March 28, 1968 |
| [45] | Patented | Nov. 10, 1970 |
| [73] | Assignee | Ether Limited |
| [32] | Priority | March 30, 1967 |
| [33] | | Great Britain |
| [31] | | No. 14,655/67 |

[54] FLUID-CONTROLLING VALVE MEANS
8 Claims, 2 Drawing Figs.

[52] U.S. Cl. ............................................. 137/614.21,
138/45; 251/122, 251/129
[51] Int. Cl. .................................................. F16k 1/54
[50] Field of Search ......................................... 137/614.21;
251/122, 315, 129, 285; 138/44, 45, 46

[56] References Cited
UNITED STATES PATENTS
1,734,095  11/1929  Mancib ........................ 251/122X

| 2,819,432 | 1/1958 | Ray ............................... | 251/129X |
| 3,280,836 | 10/1966 | Callahan ....................... | 137/614.21 |
| 3,321,195 | 5/1967 | Korte ............................ | 251/285X |
| FOREIGN PATENTS | | | |
| 834,329 | 8/1938 | France .......................... | 251/215 |
| 1,002,581 | 2/1957 | Germany ...................... | 251/215 |

Primary Examiner—Alan Cohan
Attorney—Lawrence E. Laubscher

ABSTRACT: Fluid controlling valve means include a hollow body member having inlet and outlet ports connected for fluid flow therebetween by conduit means within the body. The conduit includes a passageway of which one end is selectively opened and closed by a valve plunger while the other end is entered by a tapering control member, the position of which along the axis of the passageway determines the fluid flow rate when the valve is open.

Patented Nov. 10, 1970

3,538,951

Norris Bownass
INVENTOR

BY
Lawrence E. Laubscher
ATTORNEY

FLUID-CONTROLLING VALVE MEANS

This invention relates to adjustable valves and more particularly though not exclusively to solenoid valves such as are required, for example, in pneumatically actuated machine tool control systems.

It is an object of the present invention to provide an improved fluid controlling valve having a first condition in which fluid flow between an inlet port and an outlet port is prevented and a second condition permitting adjustably controlled fluid flow between said ports.

It is a further object of the invention to provide fluid controlling valve means capable of actuation between a closed condition and an adjustably open condition under control of an electric current.

In one embodiment fluid controlling valve means in accordance with the present invention includes a hollow body member having inlet and outlet ports and conduit means within the body connecting the ports for fluid flow therebetween, by way of valve means operable between a closed condition preventing fluid flow and an open condition permitting adjustably controlled fluid flow between the ports. Said conduit means includes a passageway having apertures at each end thereof and an axis extending between said ends. The valve also includes plunger means mounted for controlled movement between a first position in which a surface thereof closes one said aperture and a second position in which said surface is spaced from said aperture. The valve further includes a control member of varying cross section mounted with respect to said body member for movement within the other of said apertures along said axis to produce a continuous change in the effective cross-sectional area of said aperture, thereby adjustably to control said fluid flow in said second position of said plunger.

The features of the invention which are believed to be novel are recited with particularity in the appended claims.

Figure 2:
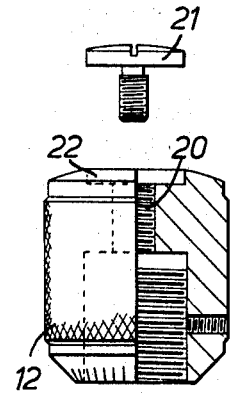
Figure 2:
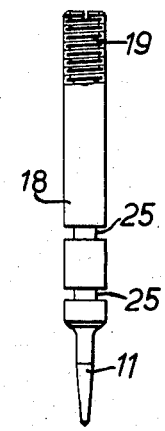

The invention, together with further features and advantages thereof, is best understood from the following description taken in conjunction with the accompanying drawings, in the two FIGS. of which like elements are denoted by like reference numerals and in which:

FIG. 1 is a sectional elevation of a valve in accordance with the invention; and FIG. 2 is an exploded view of the components of one assembly of the valve shown in FIG. 1.

The valve shown in the drawings comprises a body member 1 having aligned entry and exit connections 2, 3 respectively. Air entering the valve at 2 passes through a port 4 into an annular space 5 surrounding a conical valve seat 7 pierced by an axial bore. Space 5 is closed on one side by the valve body and on the other side by a cover plate 6. When the valve is closed the bore in valve seat 7 is closed by a resilient washer 8 urged against the valve seal by a shutoff valve plunger 9 which is usually resiliently biased in the direction to close the valve.

The shutoff valve is opened by the action of a magnetic field. Plunger 9 is formed of ferromagnetic material and when resiliently biased to close the valve may be withdrawn to open the valve by exciting an appropriately positioned coil surrounding a tubular extension 10 of cover plate 6 within which plunger 8 slides.

When the shutoff valve is open, the flow of air through it is controlled by regulating valve means including a tapered needle 11 which enters the bore in valve seat 7 to an extent determined in operation by the setting of an adjusting knob 12. Knob 12 is internally screw-threaded and is screwed on to an externally screw-threaded bushing 13 which is secured to the valve body by brazing or welding. A ring nut 14 upon bushing 13 serves to secure the valve to a mounting member or panel 15. Movement of knob 12 on bushing 13 is limited by a grub-screw 16 which is screwed into a radial hole in the knob and protrudes inwardly into an annular recess 17 formed in the periphery of the bushing. Engagement of the end of the grub screw with one or other radial face of the recess prevents further axial movement of the knob and thus of the adjusting needle.

In order to ensure that a desired range of control is in fact obtained by rotation of the adjusting knob, needle 11 is carried on a needle rod 18 having a screw-threaded portion 19 which is screwed into an axial, screw-threaded hole 20 in knob 12. The end of the needle rod remote from the needle is provided with a screw-driver slot to permit this adjustment being affected without dismantling the valve. To lock the adjusting knob on the needle rod, the latter has an axial screw-threaded hole in which screws a disc-headed screw 21 which engages in a counterbore 22 in the end of the knob. Tightening this screw prevents relative movement of knob and needle shaft without producing relative movement between them.

The end of the knob nearer the valve body may be provided with scale marks 23 cooperating with an index marked on or secured by mounting nut 14. The needle rod 18 is sealed in the bushing by O-rings such as 24 held in grooves 25 in the rod.

Tubular extension 10 of cover plate 6 is surrounded by an insulating bobbin 26 on which is wound an electromagnetic coil 27 provided with terminals 28, 29. The passage of an electric current through coil 27 from a current source, which is represented for convenience as a battery 30, under the control of a switch 31 produces an axial magnetic field in the coil by which ferromagnetic plunger 9 is urged away from valve seat 7 against the resilient bias of a helical compressive spring 32 which bears against plunger 9 and against a plug member 33 screwed into the outer end of tubular extension 10.

An advantage of a valve according to the invention is that after initial assembly it may be adjusted on test so that a particular knob setting corresponds to a predetermined rate of flow.

In other embodiments of the invention the plunger movement may be produced by pressure of a fluid on a member of which a part forms the valve plunger. It is considered unnecessary to discuss details of these embodiments.

I claim:

1. In a fluid control valve including a hollow valve body having inlet and outlet ports, said body containing conduit means including a passageway open at each end for connecting said ports for the flow of fluid therebetween; and valve means for controlling the flow of fluid between said ports, said valve means including solenoid-operated shutoff valve means (8) operable alternately to fully close and fully open, respectively, the aperture at one end of said passageway, and regulating valve means for regulating the effective cross section of the aperture at the other end of said passageway, said regulating valve means including a control member (11) of varying cross section adapted to extend within the associated aperture, and adjusting means including an adjusting member (12) threadably connected with said body for displacing said control member axially of said passageway to vary the effective cross section of the aperture associated therewith; the improvement wherein said adjusting means further includes means (19, 20) for displacing said control member relative to said adjusting member to vary the axial position of said control member relative to the associated aperture when said adjusting member is maintained stationary relative to the body; and locking means (21) for locking said control member (11) to said adjusting member and thereby prevent relative movement therebetween.

2. The improvement claimed in claim 1, and further including stop means limiting the axial range of movement of said adjusting member.

3. The improvement claimed in claim 2 including a circumferential groove in the external surface of said adjusting member within said mounting member, and abutment means projecting from said mounting member within said groove thereby to limit axial movement of said adjusting member.

4. Apparatus as defined in claim 1, wherein said valve body contains a transverse wall having a conical projection containing a through bore defining said passageway, and further wherein said shutoff valve means includes a plunger mounted for axial movement between fully closed and fully open positions relative to said conical projection and the corresponding aperture.

5. The improvement claimed in claim 4 including scale means and cooperating index means fixed respectively to one of said adjusting member and said mounting member thereby to denote the relative position of said members.

6. The improvement claimed in claim 5 including an internal screw-threaded bore formed in said adjusting member, a conically tapered control member having an external screw thread engaged in said bore to permit relative axial displacement of said control and adjusting members and having an internally screw-threaded recess, and a locking member having a first screw-threaded portion engaged in said recess and having a second portion frictionally engaging a surface of said adjusting member thereby to lock said control and adjusting members together.

7. The improvement claimed in claim 6, said bore in said adjusting member having screw-threaded portions of larger diameter and of smaller diameter, and said mounting member having an externally screw-threaded portion of said larger diameter engaged by said adjusting member and said control member engaging said portion of smaller diameter.

8. Apparatus as defined in claim 4, wherein said plunger is formed of a ferromagnetic material, and further including spring means biasing said plunger toward the closed position, and electromagnetic means for operating said plunger means to the open position relative to the associated aperture.